US010102541B2

(12) United States Patent
Scotto et al.

(10) Patent No.: US 10,102,541 B2
(45) Date of Patent: *Oct. 16, 2018

(54) SYSTEM AND METHOD OF PROVIDING A PARTICULAR NUMBER OF DISTRIBUTIONS OF MEDIA CONTENT THROUGH A PLURALITY OF DISTRIBUTION NODES

(71) Applicant: Catalina Marketing Corporation, St. Petersburg, FL (US)

(72) Inventors: Adam Michael Scotto, Brookline, MA (US); Nikhil Gopinath Kurup, Clearwater, FL (US)

(73) Assignee: CATALINA MARKETING CORPORATION, St. Petersburg, FL (US)

( * ) Notice: Subject to any disclaimer, the term of this patent is extended or adjusted under 35 U.S.C. 154(b) by 210 days.

This patent is subject to a terminal disclaimer.

(21) Appl. No.: 15/149,916

(22) Filed: May 9, 2016

(65) Prior Publication Data
US 2016/0253698 A1 Sep. 1, 2016

Related U.S. Application Data

(63) Continuation of application No. 14/199,576, filed on Mar. 6, 2014, now Pat. No. 9,336,537.

(51) Int. Cl.
G06Q 30/02 (2012.01)
H04L 29/06 (2006.01)
H04L 29/08 (2006.01)

(52) U.S. Cl.
CPC ..... *G06Q 30/0244* (2013.01); *G06Q 30/0277* (2013.01); *H04L 65/4076* (2013.01); *H04L 67/1097* (2013.01)

(58) Field of Classification Search
CPC ................. G06Q 30/0207–30/0277
See application file for complete search history.

(56) References Cited

U.S. PATENT DOCUMENTS 7,136,871 B2 * 11/2006 Ozer ...................... G06Q 30/02
7,188,137 B2    3/2007 Inoue et al. .................. 709/203
(Continued)

FOREIGN PATENT DOCUMENTS

EP    0861461 B1    10/2008
EP    2003588 A2    12/2008
(Continued)

OTHER PUBLICATIONS

Japanese Office Action from Japanese Patent Application No. 2016-555726, dated Dec. 12, 2017, 4 pages.
(Continued)

*Primary Examiner* — David J Stoltenberg
(74) *Attorney, Agent, or Firm* — McDermott Will & Emery LLP

(57) ABSTRACT

The invention relates to systems and methods of providing a particular number of distributions of media content through a plurality of distribution nodes, which individually distribute the media content to users and/or other distribution nodes. The system may provide the media content and an allocation of the media content to a distribution node. The allocation may specify whether the distribution node may distribute the media content (e.g., a binary indication) or a number of times that the distribution node may distribute the media content during a time interval. By keeping track of allocations to and distributions by various distribution nodes, the system may adjust allocations and distributions to ensure adherence to the limit. For instance, the system may turn off distribution by some distribution nodes while allowing distribution by others. The system may also or instead
(Continued)

reduce allocations or time intervals during which the various distribution nodes may distribute the media content.

12 Claims, 6 Drawing Sheets

(56) References Cited

U.S. PATENT DOCUMENTS

| | | | |
|---|---|---|---|
| 7,359,952 B2 | 4/2008 | Doemling et al. ............ 709/217 |
| 7,650,376 B1* | 1/2010 | Blumenau ............ H04L 67/1008 |
| | | | 709/203 |
| 7,779,097 B2* | 8/2010 | Lamkin ............ G06F 17/30174 |
| | | | 709/223 |
| 8,155,990 B2* | 4/2012 | Chickering ........ G06Q 10/0631 |
| | | | 705/14.4 |
| 9,100,464 B2* | 8/2015 | Dasher ............... H04L 65/4076 |
| 9,197,712 B2* | 11/2015 | Gopalakrishnan ........................ |
| | | | H04N 21/2225 |
| 9,336,537 B2 | 5/2016 | Scotto et al. |
| 9,516,084 B2* | 12/2016 | Phillips ................ H04L 65/601 |
| 2002/0036800 A1 | 3/2002 | Nozaki et al. |
| 2004/0260839 A1 | 12/2004 | Onoda et al. ................ 709/247 |
| 2005/0246432 A1 | 11/2005 | Iijima et al. ................. 709/223 |
| 2006/0117090 A1 | 6/2006 | Shellingerhout |
| 2007/0174888 A1 | 7/2007 | Rubinstein .................... 725/115 |
| 2008/0019276 A1 | 1/2008 | Takatsuji et al. |
| 2009/0006145 A1 | 1/2009 | Duggal et al. .................... 705/6 |
| 2010/0082397 A1* | 4/2010 | Blegen .................. G06Q 30/02 |
| | | | 705/14.58 |
| 2010/0114696 A1* | 5/2010 | Yang ...................... G06Q 30/02 |
| | | | 705/14.49 |
| 2010/0191558 A1* | 7/2010 | Chickering ........ G06Q 10/0631 |
| | | | 705/7.29 |
| 2010/0293047 A1* | 11/2010 | Schwarz ................ G06Q 30/02 |
| | | | 705/14.42 |
| 2011/0029376 A1* | 2/2011 | Mills ................ G06F 17/30539 |
| | | | 705/14.43 |
| 2011/0078000 A1* | 3/2011 | Ma ......................... G06Q 30/02 |
| | | | 705/7.37 |
| 2011/0119136 A1 | 5/2011 | Eldreth et al. ............. 705/14.69 |
| 2011/0153698 A1 | 6/2011 | Takeshima et al. .......... 707/827 |
| 2011/0183655 A1 | 7/2011 | Cao et al. ................... 455/414.1 |
| 2012/0150639 A1 | 6/2012 | Li et al. ...................... 705/14.49 |
| 2012/0166261 A1 | 6/2012 | Velusamy et al. |
| 2013/0262693 A1* | 10/2013 | Phillips ................ H04N 21/222 |
| | | | 709/231 |
| 2013/0290711 A1 | 10/2013 | Rajkumar et al. ............ 713/168 |
| 2014/0006930 A1* | 1/2014 | Hollis .................. G06F 17/2247 |
| | | | 715/234 |
| 2014/0075466 A1* | 3/2014 | Zhao ................... H04N 21/4784 |
| | | | 725/23 |
| 2014/0075469 A1* | 3/2014 | Zhao ................... H04N 21/4784 |
| | | | 725/32 |
| 2014/0100944 A1* | 4/2014 | Zhu ..................... G06Q 30/0275 |
| | | | 705/14.41 |
| 2014/0157337 A1* | 6/2014 | Gopalakrishnan .......................... |
| | | | H04N 21/2225 |
| | | | 725/93 |
| 2015/0012593 A1* | 1/2015 | Phillips ............... H04L 67/2847 |
| | | | 709/204 |
| 2015/0188758 A1* | 7/2015 | Amidei ................ H04L 41/0896 |
| | | | 709/220 |
| 2015/0188842 A1* | 7/2015 | Amidei .................. H04L 47/783 |
| | | | 709/226 |
| 2015/0188921 A1* | 7/2015 | Amidei .................... H04L 63/20 |
| | | | 726/1 |
| 2015/0189017 A1* | 7/2015 | Amidei ............... H04L 67/1097 |
| | | | 726/4 |
| 2015/0254734 A1* | 9/2015 | Scotto ................ G06Q 30/0277 |
| | | | 705/14.73 |

FOREIGN PATENT DOCUMENTS

| | | |
|---|---|---|
| EP | 2562710 A1 | 2/2013 |
| JP | 2002-163535 A | 6/2002 |
| JP | 2002-520721 A | 7/2002 |
| JP | 2003-178225 A | 6/2003 |
| JP | 2003-323342 A | 11/2003 |
| JP | 2007018301 A | 1/2007 |
| JP | 2011-34304 A | 2/2011 |
| JP | 2015-99478 A | 5/2015 |
| WO | WO 2000/004706 | 1/2000 |
| WO | WO 2008/127634 | 10/2008 |
| WO | WO-2014/192419 A1 | 12/2014 |
| WO | WO 2015/134903 | 9/2015 |

OTHER PUBLICATIONS

Extended European Search Report from European Patent Application No. 15758082.0, dated Jul. 24, 2017, 11 pages.
European Office Action from European Patent Application No. 15758082.0, dated Mar. 26, 2018, 8 pages.

* cited by examiner

SYSTEM AND METHOD OF PROVIDING A PARTICULAR NUMBER OF DISTRIBUTIONS OF MEDIA CONTENT THROUGH A PLURALITY OF DISTRIBUTION NODES

CROSS REFERENCE TO RELATED APPLICATION

This application is a continuation of U.S. patent application Ser. No. 14/199,576 filed Mar. 6, 2014, entitled "SYSTEM AND METHOD OF PROVIDING A PARTICULAR NUMBER OF DISTRIBUTIONS OF MEDIA CONTENT THROUGH A PLURALITY OF DISTRIBUTION NODES" the entirety of which is incorporated herein by reference.

FIELD OF THE INVENTION

The invention relates to systems and methods of providing a particular number of distributions of media content to users through a plurality of distribution nodes.

BACKGROUND OF THE INVENTION

Media content such as coupons, advertisements, music, and the like may be provided to users in order to incent a purchase, attain brand awareness, and achieve other goals. However, the issuance of too many coupons for an item may cause an unnecessary loss of profits relative to the benefits of the coupon for the issuer. More generally, consumer fatigue may result if media content is distributed to users too frequently. Consumer fatigue may occur when, for example, a user is over-exposed to the media content, or to items that are being promoted by the media content. As a result, the effect of the media content may be diluted, and the image of the items being promoted may be tarnished.

Moreover, in some systems, the distribution of media content may occur via numerous channels including, for instance, via various retailers, chains of retailers, websites, or other outlets. Thus, it can be quite difficult to track and limit the distribution of media content across various communication channels especially when they are distributed and federated in nature.

SUMMARY OF THE INVENTION

The invention addressing these and other drawbacks relates to systems and methods of limiting an aggregate number of times that media content is distributed to users through a plurality of distribution nodes.

In one implementation, the system may provide the media content and one or more distribution parameters that specify whether and how the distribution node is allowed to distribute the media content. The one or more distribution parameters may include an indication of whether or not the distribution node may distribute the media content (e.g., a binary indication) during a given interval, or an indication of a number of times that the distribution node may distribute the media content during the given time interval. By monitoring media content and distribution parameters provided to various distribution nodes, as well as distributions made by the various distribution nodes, the system may adjust distributions of media content to ensure adherence to an aggregate limit. For instance, the system may disable distribution by some distribution nodes while allowing distribution by others. The system may also or instead reduce allocations or time intervals during which the various distribution nodes may distribute the media content.

A media provider that provides media content may use the system to leverage the distribution nodes provided by the system while limiting the number of times that the media content is distributed to users. Various types of media providers may use the system to distribute various types of media content. For example, a product manufacturer may wish to distribute coupons using the system. The product manufacturer may wish to allow printing by various distribution nodes (e.g., in-store printers, at-home printers, kiosks, etc.), but limit the total number of times that the coupon is printed by the distribution nodes. In another example, a media studio (e.g., a movie studio, a record company, etc.) may use the system to distribute media content such as movie trailers or music samples to users using the system. The media studio may wish to allow the media content to be played through social media platforms, media streaming websites, and/or other distribution nodes that may distribute media content.

In one implementation, a media provider may also or instead impose limits on the timing for which the media content is to be distributed by the system. For example, limits on the timing may include an indication to distribute media content by a given date, within a given time period (e.g., from January to February), and/or time specification that governs how media content should be distributed to users through the distribution nodes.

To facilitate these and other functions, the system may include a computing device that provides the media content to a given distribution node. At various times along with and/or after the media content is provided to the given distribution node, the computing device may provide an indication that the distribution node may distribute the media content. The indication may include a binary indication of whether or not the distribution node may distribute the media content, a number of times that the distribution node may distribute the media content, and/or other indication. Absent an indication that the distribution node may distribute the media content, the distribution node will not distribute the media content. The computing device may provide different types of indications based on different models of operation.

In a block model of operation, the indication may include a block allocation, which may indicate a limit on the number of times that the given distribution node may distribute the media content. The computing device may, at various times (including along with the media content or after the media content is provided), determine and provide the block allocation to the distribution node. This allows the distribution node to distribute media content up to its block allocation without requiring the distribution node to contact the computing device after each individual distribution of the media content. In implementations where the distribution node is provided a time interval within which to distribute the media content, the distribution node may also use the block allocation to control the rate at which the distribution node provides the media content.

The block allocation may include a default allocation and/or a custom allocation that is dynamically generated based on one or more variables. For custom allocations, the computing device may take into account an ability by a given distribution node to distribute the media content. For example, one distribution node may be able to deliver a greater quantity of the media content than another distribution node. The computing device may account for the foregoing and other differences by providing custom allocations of blocks (e.g., larger blocks for higher volume distribution nodes) of the media content to different distribution nodes.

When a given distribution node is provided with an allocation of a block of the media content, the given distribution node may limit its distribution of the media content using its allocated block, whether to users or to other distribution nodes. By monitoring the blocks allocated to all of the distribution nodes, the computing device may impose a limit on the aggregate number of times that all of the distribution nodes may distribute the media content. For example, when a block is allocated to a distribution node, the computing device may decrement an available number of times that the media content may be aggregately distributed (and/or increment a number of times that the media content has been distributed).

In a flag model of operation, the indication may include a flag that indicates whether the distribution node may distribute the media content without limit during a given time interval. The computing device may communicate the flag to the distribution node, which may occur at various times. If the flag indicates that the media content may be distributed, the distribution node will distribute the media content without limit during the given time interval. Otherwise, the distribution node will not distribute the media content at all. In this manner, the computing device may indicate whether a given distribution node may distribute the media content during the given time interval. Such indications may include a custom indication for a given distribution node (allowing the system to disallow distribution by a particular distribution node while allowing distribution by another distribution node) or a global indication to all distribution nodes.

In one implementation, the computer may customize the given time interval for a given distribution node. For example, higher volume distribution nodes may be provided with a smaller time interval over which distribution (unlimited or otherwise) is allowed, while lower volume distribution nodes may be provided with a larger time interval. In this manner, the risk that a high volume distribution node will over-distribute the media content may be reduced. The computing device may further reduce the risk of exceeding the aggregate limit during a flag model of operation by generating a confidence index that indicates a probability that the media content can be distributed without exhausting the aggregate limit. For example, a lower confidence index may indicate a greater risk of exceeding the aggregate limit. As such, when the confidence index is low, the computing device may reduce the risk of exceeding the aggregate limit by adjusting the intervals for the distribution nodes, disabling distribution for some or all of the distribution nodes, and/or taking other actions.

Whichever model of operation is used, a given distribution node may, at intervals, contact the computing device to provide feedback information to the computing device. Alternatively or additionally, the computer may, at intervals, contact the given distribution node as well. The intervals may be predefined for a given distribution node or may be dynamically determined. For example, one distribution node may be required to periodically contact the computing device after expiration of a predefined time interval, while another distribution node may be required to contact the computing device at a time that the computing device determines. Predefined time intervals may be suitable, for example, during a block model of operation while dynamically determined intervals may be suitable during a flag model of operation.

The computing device may use the feedback information received from a distribution node to adjust distribution of the media content. For example, in block models of operation, the computing device may add any unused portion of an allocation (as reported by a distribution node) back to a pool of available allocations. The computing device may alternatively or additionally adjust block allocations/sizes based on feedback information received from the distribution nodes to thereby take into account the ability of a given distribution node to distribute the media content.

In flag models of operation, the computing device may adjust the length of a time interval, during which a given distribution node is allowed to distribute media content, based on a number or rate of distribution as reported back from the distribution node to thereby reduce the risk associated with exceeding the aggregate limit.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
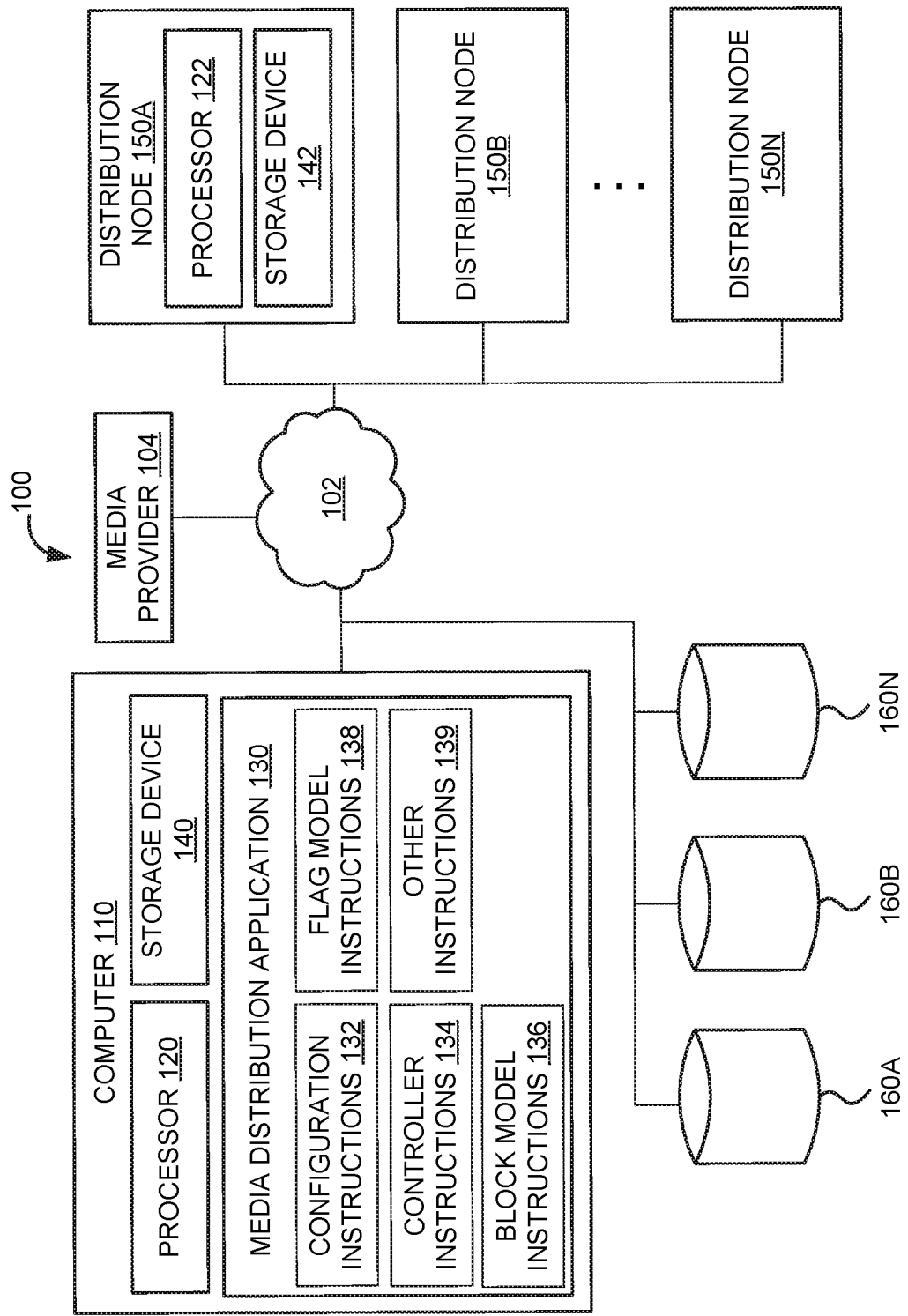
FIG. 1 illustrates a system of limiting an aggregate number of times that media content is provided across a plurality of distribution nodes, according to an implementation of the invention.

FIG. 1 illustrates a system 100 for limiting an aggregate number of times that media content may be provided across a plurality of distribution nodes, according to an implementation of the invention.

As a general overview, system 100 may obtain media content and one or more distribution parameters from one or more media providers. The one or more distribution parameters may specify an aggregate limit on the number of distributions of the media content. System 100 may provide the media content and an allocation of the media content to a distribution node. The allocation may specify whether or not the distribution node may distribute the media content (e.g., a binary indication) or a number of times that the distribution node may distribute the media content during a time interval. By monitoring allocations to and distributions by various distribution nodes, the system may adjust allocations and distributions to ensure adherence to the aggregate limit. For instance, the system may disable distribution by some distribution nodes while allowing distribution by others. The system may also or instead reduce allocations or time intervals during which the various distribution nodes may distribute the media content, and/or take other actions to ensure that the aggregate limit is not exceeded.

System 100 may include a media provider 104, a computer 110, a plurality of distribution nodes 150 (illustrated in FIG. 1 as distribution nodes 150A, 150B, . . . , 150N), one or more databases 160, and/or other components.

Media Providers

Media provider 104 may provide the media content and one or more distribution parameters to computer 110. In some implementations, media provider 104 may provide the media content without restriction. Thus, in these implementations, the system may provide some media content with restrictions (e.g., an aggregate limit) and provide other media content without restrictions.

Media provider 104 may include, without limitation, a manufacturer of a product, a provider of a service, a marketing corporation, an entertainment entity, and/or other entity that wishes to provide the media content for particular number of times through the plurality of distribution nodes 150. Media provider 104 may wish to provide the media content for the particular number of times to prevent consumer fatigue with respect to the media content and/or limit incentives provided using the media content. Other reasons for a particular number of distributions of the media content will also be apparent.

Examples of media content may include, without limitation, a printed coupon (e.g., print information used by a printer to print the coupon), an electronic coupon, an advertisement, music, a movie, a game, and/or other content that may be distributed by the distribution nodes 150. The media content may be distributed in one or more formats such as paper (e.g., for printed coupons), video, image, text, executable file, interpreted file, machine encoding, and/or other format that can be distributed by the distribution nodes 150. The media content may be distributed according to a single format (e.g., all distributed as printed coupons) or a combination of formats (e.g., some distributed as printed coupons and others distributed as electronic coupons). A distribution of the media content may include a discrete file transfer (e.g., a download), a printout, a stream (e.g., a video stream), and/or other methods by which the media content may be transferred.

In some implementations, distribution of the media content may be counted toward the aggregate limit regardless of the particular format in which the media content was distributed. In other implementations, the particular format may be weighted relative to other formats (e.g., distribution of a paper coupon may be weighted more heavily than distribution of an electronic coupon, a music video may be weighted more heavily than an audio track, etc.). For example, an aggregate limit on a particular coupon may be set at 15,000 distributions. A paper coupon may be distributed only a total of 10,000 times via printers whereas an electronic coupon may be distributed a total of 15,000 times via electronic channels. In this sense, the paper format may be weighted more heavily (e.g., 1.5 times) relative to the electronic coupon with respect to counting toward the aggregate limit. Combinations of paper and electronic coupons may also be used, taking into account the relative weights of each format. In this manner, media provider 104 may design rich campaigns using various different formats that are intended to limit the number of times that the media content is distributed while employing a plurality of distribution nodes 150.

Computer 110

Regardless of the type of the media content or the manner in which the media content is formatted, computer 110 may receive the media content and distribution parameters from media provider 104 or from other sources. Computer 110 may store the media content and the one or more distribution parameters in a media content database, such as one or more databases 160. In this manner, computer 110 may later determine whether a given media content should be distributed with or without restrictions.

The distribution parameters may include an aggregate limit on the number of times that the media content should be distributed, a particular time period in which the media content should be distributed, a particular duration that the media content should be distributed, a date by which the media content should be distributed, a manner in which the media content should be distributed (which may include a white list and/or a black list of distribution nodes 150), and/or other parameters that specify how the media content should be distributed. The aggregate limit on the number of distributions may, in an implementation, include different limits for different types of media content to be distributed. For example, the aggregate limit may include one limit for printed coupons, another limit for electronic coupons, and another limit for video ads related to an item associated with the coupons, and so on.

Computer 110 may provide the media content to the distribution nodes 150 for distribution to users and maintain control over whether or not the distribution nodes 150 are permitted to distribute the media content. A given distribution node 150 will not distribute the media content when it is not permitted to do so. In some instances, one distribution node 150 may be permitted to make a distribution while another may not. In this manner, computer 110 may act as a controller that controls the number of times that the distribution nodes 150 distribute the media content.

To facilitate these and other functions, computer 110 may include a physical processor 120, a media distribution application 130, a storage device 140, and/or other components. Media distribution application 130 may include one or more computer program instructions that, when executed, program the physical processor 120 to perform various operations described herein. Media distribution application 130 may be stored in storage device 140 and/or other storage that is accessible to the physical processor 120.

Media distribution application 130 may include configuration instructions 132, controller instructions 134, block model instructions 136, flag model instructions 138, and/or other instructions 139. Configuration instructions 132 may program processor 120 to obtain the media content and the one or more distribution parameters from media provider 104.

In some implementations, configuration instructions 132 may cause (e.g., program processor 120 to cause) the media content and/or the distribution parameters to be stored in a media content database that can be accessed throughout the time that the media content is to be distributed (or thereafter for metrics purposes). The media content database may also store a number of times that the media content has actually been distributed, an allocation of the media content to a distribution node 150, an identity of the distribution node 150 that distributed the media content or to which the media content has been provided or allocated, a manner in which the media content was distributed, and/or other information that is generated in association with the distribution of media content.

Configuration instructions 132 may register a media provider 104, a distribution node 150, and/or other entity/computing device to use the system. For example, a media provider that wishes to leverage the platform provided by system 100 to distribute media content may register to use the system. Configuration instructions 132 may receive information about the media provider using conventional registration forms and databases. Once registered, a media provider may provide media content and one or more distribution parameters that specify how the media content should be distributed.

An entity may wish to register a distribution node to distribute the media content to users and/or to other distribution nodes. For example, distribution node 150 may comprise a printer device at a retail location that prints coupons or other media content, a website that provides the media content, an email server that provides emails, a social media site, a targeted offer system that provides targeted offers, and/or other type of distribution node. As such, the various distribution nodes 150 that distribute the media content may be regarded as a multi-channel communication network through which the media content may be distributed.

An entity that controls these and other types of distribution nodes may wish to register with system 100 in order to distribute media content using its infrastructure. Such entities may wish to do so in exchange for compensation by the system or other consideration. The system may benefit by expanding its network of distribution nodes 150 that can distribute the media content.

In some implementations, when media content and one or more distribution parameters (if any) are obtained, a media campaign may be initiated in which the media content is distributed using the one or more distribution parameters (if any). Controller instructions 134 may program processor 120 to periodically identify media content to be distributed according to its distribution parameters. For example, controller instructions 134 may determine whether a given media content has already been provided to distribution nodes 150. If not, controller instructions 134 may cause the media content to be provided to appropriate distribution nodes 150, which may be identified (or filtered) using white lists, black lists, geography/location, and/or other criteria specified by the distribution parameters. If no particular distribution nodes 150 are identified, controller instructions 134 may identify a default set of all (or a portion) of the distribution nodes 150.

In some implementations, an updated version of the media content may be obtained from media provider 104 that should replace existing media content. For example, revised or additional terms that are to be applied to coupons, a new version of a video, and/or other updates to the media content may be obtained. In these implementations, controller instructions 134 may provide the new or updated media content to distribution nodes 150 to replace the existing media content.

In some implementations, the media content database may store a real-time shutoff field that indicates whether or not distribution activity should be discontinued irrespective of the progress of the media campaign (e.g., even though the aggregate limit has not yet been reached). The real-time shutoff field may relate to individual media content or to groups of media content, such as those provided by a particular media provider 104. In this manner, distribution of individual media content or groups of media content may be disabled across all appropriate distribution nodes through the real-time shutoff field. In these implementations, controller instructions 134 may check the real-time shutoff field to determine whether distribution may continue. If the real-time shutoff field is "off" or otherwise indicates that distribution of corresponding media content should be disabled, controller instructions 134 may cause distribution of the media content to be discontinued across all of the appropriate distribution nodes 150. In this manner, system 100 may provide an ability to discontinue distribution of media content during a given media campaign such as when the media content contains controversial, potentially offensive, or other content that should no longer be distributed, and/or for any other reasons.

When the real-time shutoff field indicates that distribution may continue, controller instructions 134 may provide an indication that a given distribution node 150 may distribute the media content. The indication may include a number of times that distribution node 150 may distribute the media content, an indication of whether the distribution node may distribute the media content, and/or other indication. Absent an indication that the distribution node 150 may distribute the media content, the distribution node 150 will not distribute the media content. Controller instructions 134 may provide such an indication to each of distribution nodes 150 that is to distribute the media content.

In some implementations, a given distribution node 150 may periodically contact computing device 110 to provide feedback information related to distribution of the media content. Alternatively or additionally, computing device 110 may periodically contact the given distribution node 150. In other words, such contact may be initiated by the given distribution node 150 and/or computing device 110. The feedback information may include a request for an indication of whether distribution of the media content may be distributed, an indication of the number of times that the distribution node 150 actually distributed the media content (e.g., since the last time that the distribution node 150 provided such feedback information and/or an aggregate number of times since the media campaign started), and/or other information related to distribution of the media content.

The periodic contact may be defined by a time interval for which the distribution node 150 should contact computing device 110. The time interval may be predefined for the given distribution node 150 or may be dynamically determined. For example, one distribution node may be required to periodically contact computing device 110 after expiration of a predefined time interval while another distribution node may be required to contact the computing device at a time determined by computing device 110.

In some implementations, controller instructions 134 may use feedback information to adjust distribution of the media content. For example, controller instructions 134 may alter the rate at which the media content is distributed, the number of distribution nodes 150 used to distribute the media content, and/or otherwise adjust the media campaign based on the feedback information.

In some implementations, controller instructions 134 may provide different types of indications based on the model of operation (e.g., block model or flag model) being used. For example, controller instructions 134 may include or otherwise use block model instructions 134 and flag model instructions 136 to provide indications of whether or how many times a given distribution node 150 may distribute the media content.

Block model instructions 134 may determine an allocation of a block of the media content for distribution node 150 based on a block model of operation. The block may, for example, indicate a limit on the number of times that the given distribution node may distribute the media content. The allocated block may relate to the foregoing time interval during which the given distribution node 150 may distribute the media content.

When a given distribution node 150 is provided with a block allocation, the given distribution node will limit its distribution of the media content using its block allocation, whether to users or to other distribution nodes. By monitoring the blocks allocated to all of the distribution nodes 150, controller instructions 134 may impose a limit on the aggregate number of times that all of the distribution nodes 150 may distribute the media content. For example, when a block is allocated to a distribution node 150, controller instructions 134 may decrement an available number of times that the media content may be aggregately distributed or allocated (and/or increment a number of times that the media content has been distributed or allocated).

The allocated block may include a default block allocation that is determined based on one or more variables. For example, the default block may be determined based on the following equation:

$$D_n = \frac{C}{n} * \frac{t_n}{T} \qquad (1)$$

wherein:
 $D_n$=the default block allocation for a given distribution node 150,
 C=the aggregate limit on the number of distributions of the media content,
 n=the total number of distribution nodes 150 that computing device 110 uses to distribute the media content,
 $t_n$=the time interval that the given distribution node 150 contacts computer 110, and
 T=the total duration of time over which the media content should be distributed (which may be determined based on the distribution parameters or otherwise determined by computer 110).

The ratio C/n represents the number of times that a given distribution node 150 would be allowed to distribute the media content if such allocations were uniformly distributed to all distribution nodes 150 to which computer 110 provides the media content.

The ratio $t_n$/T may indicate the number of times that the given distribution node 150 should be allowed to distribute the media content during a given time interval.

Taken together, C/n and $t_n$/T indicates a default block allocation that should be provided to a given distribution node 150 each time that the distribution node 150 contacts computing device 110 to request a new block allocation. In other words, the default block allocation gives an indication of the number of times that the distribution node 150 may distribute the media content during the time interval, $t_n$.

In some implementations, the given distribution node 150 may be allowed to distribute the media content even when it is unable to communicate with computing device 110 after a given time interval has expired (e.g., in cases where the distribution node 150 will be offline such as not connected to a network or otherwise not in contact with computing device 110). For example, the given distribution node 150 may anticipate being unable to contact computing device 110 to request a new block allocation for a number of time intervals. In this instance, computing device 110 may determine a block allocation by adjusting the default block allocation to account for the number of time intervals so that the given distribution node 150 may continue to distribute the media content while offline. For example, the default block allocation may be adjusted based on the equation:

$$B_n = D_n * m \qquad (2)$$

wherein:
 $B_n$=block allocation for the given distribution node 150, and
 m=the number of time intervals that the given distribution node 150 may continue to distribute the media content even without contacting computing device 110.

Before a block allocation, $B_n$ (e.g., a default block allocation or other block allocation), is provided to a given distribution node 150, controller instructions 134 may determine whether the block allocation may be provided without exceeding the aggregate limit. For example, controller instructions 134 may monitor previous block allocations, actual distributions of the media content, and/or other information that indicates a reserved allocation or actual distribution of the media content. In this manner, controller instructions 134 may determine a remaining number of times that the media content may be distributed or allocated based on what has already been allocated or distributed.

If the block allocation would exceed the remaining number of times that the media content may be distributed or allocated, controller instructions 134 may adjust the block allocation based on the equation:

$$B_n = \frac{R}{n} \qquad (3)$$

wherein:
 $B_n$=block allocation for the given distribution node 150,
 R=the remaining number, and
 n=the total number of distribution nodes 150 that computing device 110 uses to distribute the media content.

According to equation (3), controller instructions 134 may adjust the block allocation such that the remaining number of times that the media content may be distributed is divided equally among all distribution nodes 150 that distribute the media content.

In some implementations, if the remaining number falls below a threshold number, controller instructions 134 may determine that the given distribution node 150 should distribute the media content for the remaining number of times of times that the media content may be distributed or allocated. The threshold number may be predefined and/or dynamically determined based on the equation:

$$\frac{d}{100} * C \qquad (4)$$

wherein:
 d=a predefined tolerance percentage, and
 C=the aggregate limit on the number of distributions of the media content.

In some implementations, controller instructions 134 may determine that the given distribution node 150 should distribute the media content for the remaining number of times if the remaining number falls below the smaller of a predefined threshold number or a dynamically determined threshold number such as one determined based on equation (4).

In some implementations, the feedback information received from a given distribution node 150 may indicate an unused portion of an allocation. In these implementations, controller instructions 134 may add the unused portion to the remaining number of times that the media content may be distributed or allocated.

For custom allocations, controller instructions 134 may take into account an ability by a given distribution node 150 to distribute the media content. In one example, one distribution node may be able to deliver a greater quantity of the media content than another distribution node. Controller instructions 134 may account for the foregoing and other differences by providing custom block allocations (e.g., larger blocks for higher volume distribution nodes) to different distribution nodes. For instance, controller instructions 134 may determine a positive adjustment that is used increase a block allocation for a distribution node 150 that is able to distribute a greater number of the media content than other distribution nodes. Likewise, controller instructions 134 a negative adjustment that is used to decrease a block allocation for a distribution node 150 that is able to distribute a lesser number of the media content than other distribution nodes.

In some implementations, controller instructions 134 may take into account the effectiveness of a given distribution node 150 to determine whether and how much of a positive or negative adjustment should be made for the given distribution node 150. For example, the effectiveness may be determined based on a redemption rate of coupons distributed by the given distribution node 150. In this manner, the system may dynamically determine block allocations based on the performance of distribution nodes 150. Such performance may be determined based on, for example, feedback information or other information that is available to the system.

Flag model instructions 136 may provide an indication that includes a flag, which may indicate whether or not the distribution node 150 may, without limit, distribute the media content during a given time interval. Such indications may include a custom indication for a given distribution node 150 (allowing the system to disallow distribution by a particular distribution node while allowing distribution by another distribution node) or a global indication to all distribution nodes.

The given time interval may be customized for a given distribution node 150. For example, higher volume distribution nodes may be provided with a smaller interval over which unlimited distribution is allowed while lower volume distribution nodes may be provided with a larger interval. In this manner, the risk that a high volume distribution node will distribute the media content too many times may be reduced. Flag model instructions 136 may further reduce the risk of exceeding the aggregate limit during a flag model of operation by generating a confidence index that indicates a probability that the media content can be distributed without exhausting the aggregate limit. For example, a lower confidence index may indicate a greater risk of exceeding the aggregate limit. As such, when the confidence index is low, the computing device may reduce the risk of exceeding the aggregate limit by adjusting the time intervals for the distribution nodes, turning off distribution for some or all of the distribution nodes, and/or taking other actions.

In some implementations, when using a flag model of operation, the confidence index may be used to determine whether to provide a default or custom time interval for a given distribution node 150. The confidence index may be determined based on an aggregate distribution rate of all of the distribution nodes 150 to thereby assess whether the aggregate limit is likely to be reached. Furthermore, an individual distribution rate of a given distribution node 150 may be taken into account to determine a confidence index for the given distribution node 150 so that a custom time interval may be determined for the given distribution node 150, if necessary.

The aggregate distribution rate $(r_a)$ may be determined using the equation:

$$r_a = \frac{D_T}{t_D} \qquad (5)$$

wherein:
$D_T$=total number of distributions by all distribution nodes, and
$t_D$=a default time interval over which the total number of distributions were made.

An individual distribution rate $(r_n)$ may be determined using the equation:

$$r_n = \frac{D_n}{t_D} \qquad (6)$$

wherein:
$D_n$=individual number of distributions by a given distribution node 150, and
$t_D$=a default time interval over which the individual number of distributions were made.

An individual allocation $(A_n)$ for a given distribution node 150 may be determined using the equation:

$$A_n = \frac{r_n}{r_a} * R \qquad (7)$$

wherein:
$r_n$=individual distribution rate (as determined from equation (6)),
$r_a$=aggregate distribution rate (as determined from equation (5)), and
R=the remaining number of available distributions.

The Confidence Index (CI) used to determine a time interval for a given distribution node 150 may be determined using the equation:

$$CI = \frac{A_n}{r_n * t_D} * CF \qquad (8)$$

wherein:
$A_n$=individual allocation (as determined from equation (7)),
$r_n$=individual distribution rate (as determined from equation (6)), $t_D$=a default time interval over which the individual number of distributions were made, and CF=a confidence factor, which may be pre-defined to account for potential deviation from predicted distribution rates.

In some implementations, if the CI meets or exceeds a threshold confidence value (e.g., 1), the default time interval may be provided to the given distribution node 150 for which the CI applies. On the other hand, if the CI does not meet or exceed the threshold confidence value, then a custom time interval may be determined for the given distribution node 150. For example, a lower CI may indicate a lower confidence that the aggregate limit will not be exceeded (in other words, a greater likelihood of exceeding the aggregate limit).

A custom time interval ($t_n$) may be determined using the equation:

$$t_n = CI * t_D \quad (9)$$

wherein:

CI=the confidence index determined from equation (8), and $t_n$=the default time interval.

In some implementations, a custom time interval ($t_n$) may be determined for a given distribution node 150 regardless of whether the confidence index meets or exceeds the threshold confidence value. For example, a higher confidence index may be used to increase the custom time interval ($t_n$) for a given distribution node 150 relative to the default time interval.

In some implementations, controller instructions 134 may require that a given distribution node 150 check with computer 110 to determine whether the media content may be distributed each time that the given distribution node 150 plans to distribute the media content. In this manner, controller instructions 134 may impose tight control over distribution of the media content, though imposing a greater computational load on the system. Controller instructions 134 may use this type of flag or real-time model of operation when the remaining available number of distributions falls below a threshold limit to ensure that the aggregate limit is not exceeded.

In some implementations, controller instructions 134 may use one model for one distribution node 150 and another model for another distribution node 150. Likewise, when a distribution node 150 provides the media content to another distribution node, the providing distribution node 150 may use one or more of the various models. In this manner, a distribution node 150 may act as a controller and may therefore be programmed with one or more instructions of media distribution application 130.

In some implementations, the determination of whether to use a block model, flag model, or other model of allocating the media content may be based on a configuration of distribution nodes 150, the circumstances of the media campaign, and/or other information.

In some implementations, for example, controller instructions 134 may determine which model to use based on predetermined designations. For instance, a given distribution node 150 may be associated with a particular model (e.g., block model or flag model) by which to provide the media content. In other instances, a given distribution node 150 may be dynamically determined to be associated with a particular model. In some instances, controller instructions 134 may switch from one model of distribution for a given distribution node to another model, depending on particular circumstances (e.g., switch from block to flag when the remaining number of distributions is below a threshold limit).

In some implementations, circumstances of the media campaign may be used to determine the model of operation. For example, if the aggregate limit is at least an order of magnitude greater than the number of distribution nodes 150 used to distribute the media content, then a block model of allocation may be used. Otherwise, a flag model of allocation may be used.

In another example, if a maximum time interval during which the distribution nodes 150 contacts computing device 110 (or another distribution node that provides the media content) is at least an order of magnitude smaller than a total duration of time in which the media content is to be distributed, then a block model of distribution may be used. Otherwise, a flag model of allocation may be used.

The various instructions described herein are exemplary only. Other configurations and numbers of instructions may be used, as well using non-modular approaches so long as the one or more physical processors are programmed to perform the functions described herein. It should be appreciated that although the various instructions are illustrated in FIG. 1 as being co-located within a single processing unit, in implementations in which processor(s) 120, 122 includes multiple processing units, one or more instructions may be located remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of the corresponding functionality may be provided for by other ones of the instructions. As another example, processor(s) 120, 122 may be programmed by one or more additional instructions that may perform some or all of the functionality attributed herein to one of the instructions. Furthermore, although illustrated as a single device for convenience, computer 110 may include a plurality of computer devices, each including one or more processors 120 and each providing at least some of the functionality described herein.

The various instructions described herein may be stored in a storage device 140, 142, which may comprise random access memory (RAM), read only memory (ROM), and/or other memory. The storage device may store the computer program instructions (e.g., the aforementioned instructions) to be executed by processor 120, 122 as well as data that may be manipulated by processor 120, 122. The storage device 140, 142 may comprise floppy disks, hard disks, optical disks, tapes, or other storage media for storing computer-executable instructions and/or data.

The various system components illustrated in FIG. 1 may be coupled to one or more other system components via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 2:
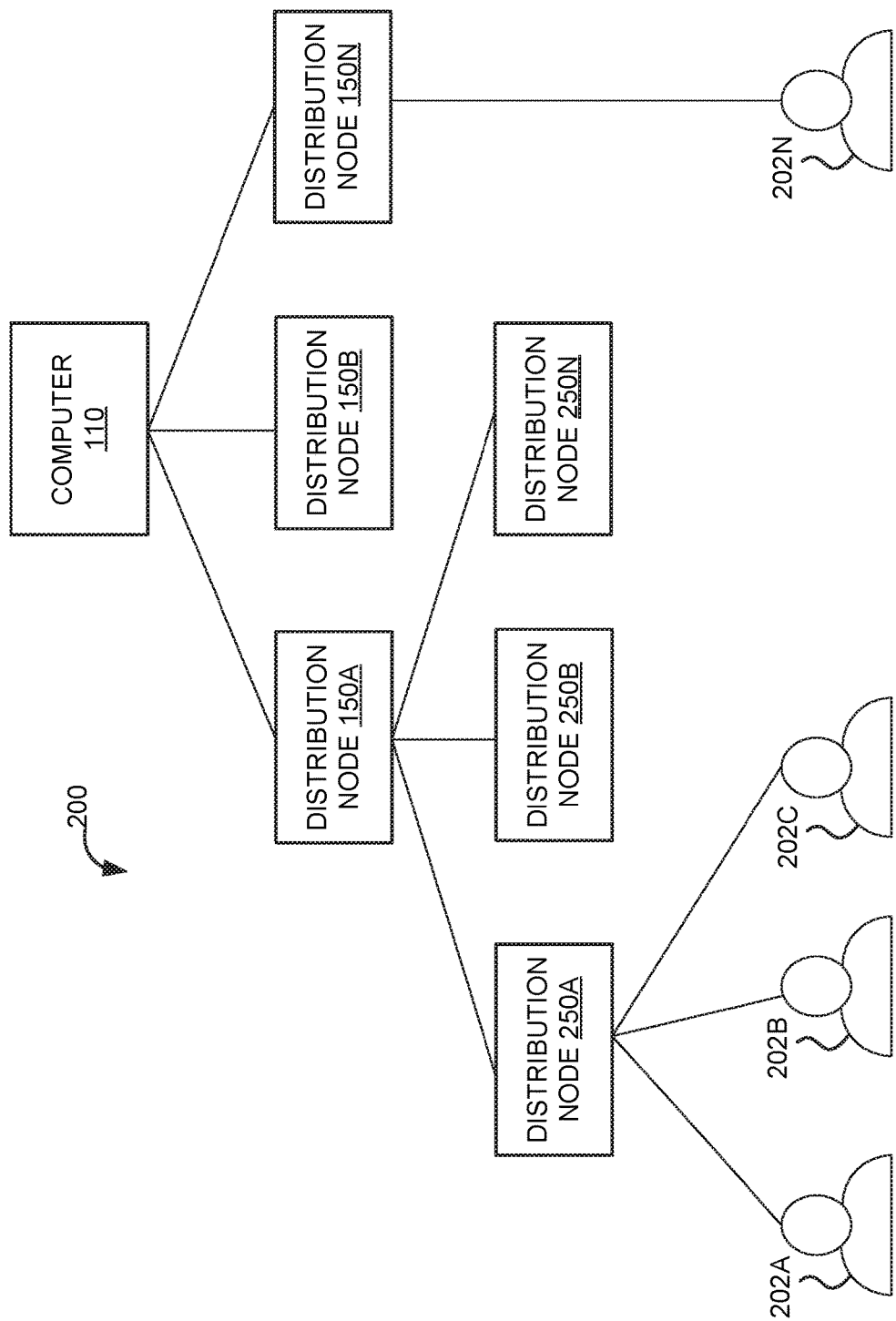
FIG. 2 illustrates a hierarchical organization of a plurality of distribution nodes that distribute media content, according to an implementation of the invention.

FIG. 2 illustrates a hierarchical organization 200 of a plurality of distribution nodes that distribute media content, according to an implementation of the invention. Computer 110 may provide media content for distribution by distribution nodes 150. Computer 110 may provide the media content using a block model, flag model, and/or other method of providing the media content to the distribution nodes.

A given distribution node 150 may distribute the media content to a user 202 (illustrated in FIG. 2 as users 202A, 202B, 202C, ..., 202N), and/or to another distribution node. For example, as illustrated, distribution node 150A may provide the media content to another distribution node 250 (illustrated in FIG. 2 as distribution node 250A, 250B, ..., 250N). A given distribution node 250 may then distribute the media content to one or more users 202 and/or to yet another distribution node (not illustrated), and so on. As illustrated, another distribution node 150N may distribute the media content directly to a user 202N. Distribution node 150B may similarly distribute the media content to users 202 and/or other distribution nodes. Accordingly, a given distribution node 150, 250 may act as a controller to distribute the media content to other distribution nodes.

In some implementations, a given distribution node 150, 250 may provide the media content according to its own block allocation. For example, computer 110 may allocate a block to distribution node 150A, which may then allocate sub-blocks (e.g., portions of its allocated block) to other distribution nodes, which may in turn allocate their own sub-blocks to users or other distribution nodes.

In some implementations, a given distribution node 150, 250 may provide the media content according to the flag provided by computer 110 or an upstream distribution node. For example, computer 110 may provide to distribution node 150A a flag that indicates that the media content may be distributed without limit during a given time interval. Distribution node 150A may provide the flag to downstream distribution nodes, which may similarly provide the flag to others.

Whether block or flag allocations are made, distribution node 150, 250 may each track the actual or allocated distributions made by downstream distribution nodes in order to report the information back up to computer 110 so that computer 110 is able to track overall distributions and allocations of the media content.

Figure 3:
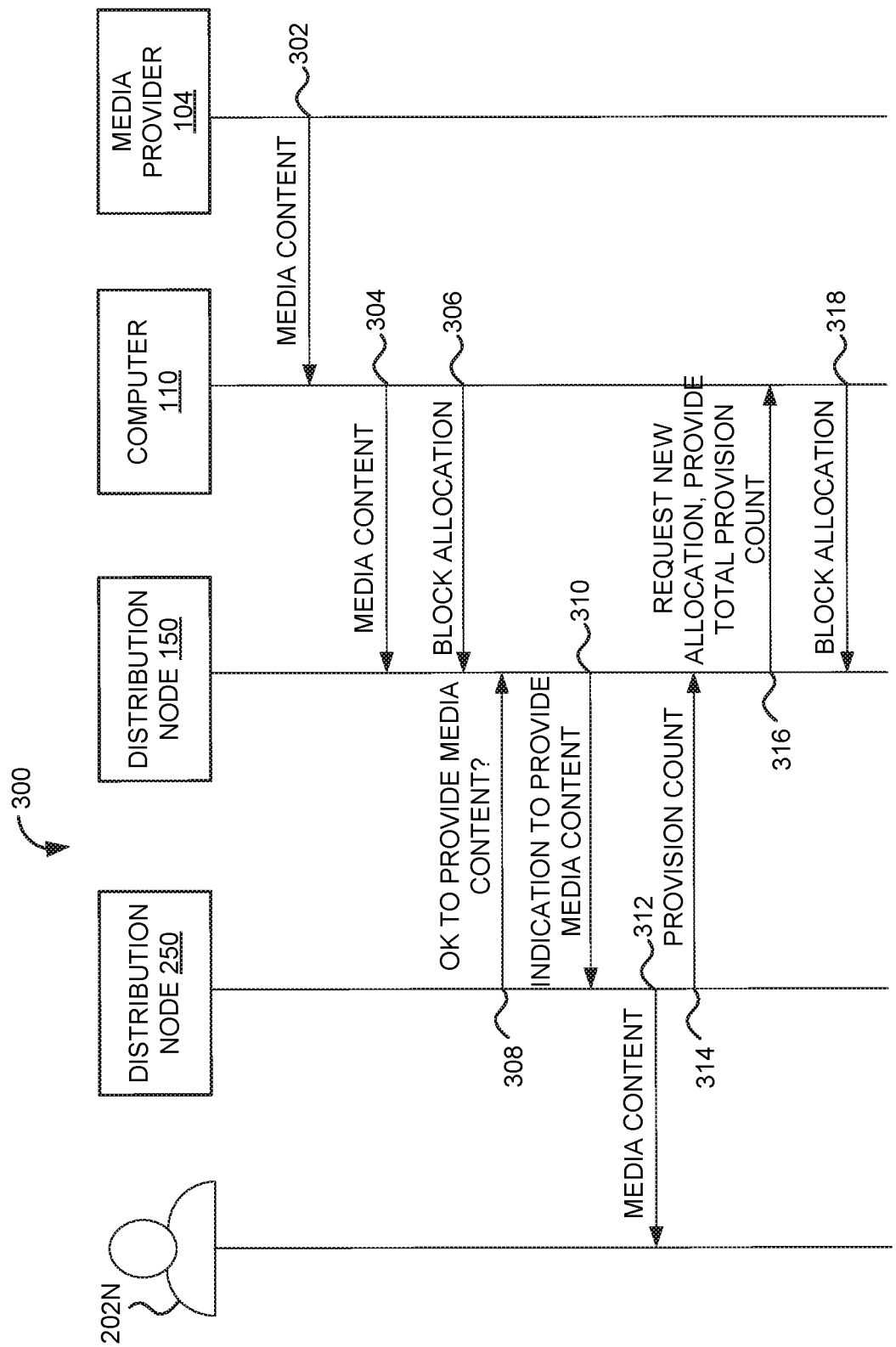
FIG. 3 illustrates a flow diagram between various entities in a system of limiting an aggregate number of times that media content is distributed across a plurality of distribution nodes, according to an implementation of the invention.

FIG. 3 illustrates a flow diagram 300 between various entities in a system of limiting an aggregate number of times that media content is provided across a plurality of distribution nodes, according to an implementation of the invention. The various processing operations and/or data flows depicted in FIG. 3 (and in the other drawing figures, including FIGS. 4-6) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, computer 110 may obtain media content from media provider 104. Media provider 104 may provide the media content with or without distribution parameters that specify, for example, an aggregate limit on the number of times that the media content should be distributed.

In an operation 304, computer 110 may provide the media content to distribution node 150. In an operation 306 (which may or may not coincide with operation 304), computer 110 may provide an allocation of the media content to distribution node 150. For example, computer 110 may provide an allocation of a block of the media content or may provide a flag indicating whether the media content may be distributed.

In an operation 308, distribution node 150 may receive a communication from distribution node 250. The communication may request whether distribution node 250 may provide the media content. In an operation 310, distribution node 150 may provide an indication that distribution node 250 may distribute the media content. For example, distribution node 150 may allocate a sub-block, which is a portion of its allocated block, to distribution node 250, may pass along the flag provided by computer 110, or may provide a flag that indicates that distribution node 250 may distribute the media content while its allocated block has not been exhausted.

In an operation 312, distribution node 250 may distribute the media content to user 202. Distribution node 250 may distribute the media content by printing a coupon, displaying an advertisement, streaming a video, and/or other otherwise providing access to the media content by user 202.

In an operation 314, distribution node 250 may provide an indication of the distribution of the media content. For example, distribution node 250 may provide a number of times that distribution node 250 distributed the media content.

In an operation 316, distribution node 150 may contact computer 110 at its regularly scheduled time (e.g., when its regular time interval has expired) and provide feedback information that may include a total count of the number of times that the media content was distributed by distribution node 150 (including any of its downstream distribution nodes). During the contact, distribution node 150 may request a new allocation of the media content. In an operation 318, computer 110 may provide the new allocation, which may be the same as (e.g., same block size) or different from (e.g., different block size or different model of allocation) the allocation provided at operation 306.

As would be appreciated, although a particular media content is described with respect to FIG. 3 and throughout this disclosure, multiple different media content from different content providers 104 may be communicated between computer 110 and the distribution nodes 150, 250. As such, each media content and allocations of the media content may be identified by an identifier that is used to keep track of the media content and the allocations of the media content.

Figure 4:
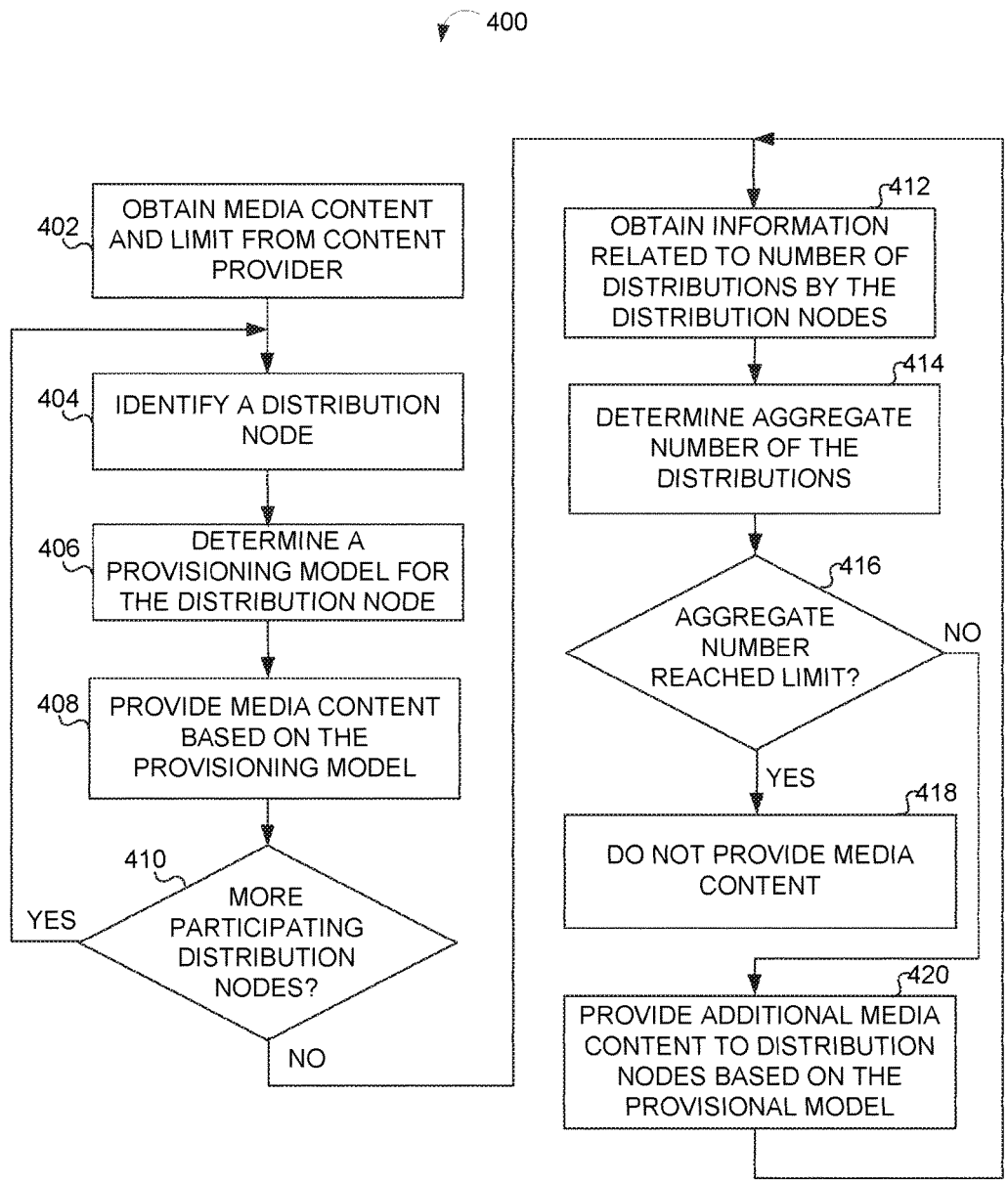
FIG. 4 illustrates a process of limiting an aggregate number of times that media content is distributed across a plurality of distribution nodes, according to an implementation of the invention.

FIG. 4 illustrates a process 400 of limiting an aggregate number of times that media content is provided across a plurality of distribution nodes, according to an implementation of the invention. In an operation 402, media content and any distribution parameters may be obtained from a content provider. In an operation 404, a distribution node may be identified. In an operation 406, a provisioning model may be determined for the identified distribution node. In an operation 408, the media content may be provided to the identified distribution node based on the provisioning model.

In an operation 410, a determination of whether more distribution nodes are to be used to distribute the media content may be made. The determination may be based on whether there exist additional participating distribution nodes, whether other distribution nodes satisfy the distribution parameters, a location of the distribution nodes (e.g., for when the media content is to be targeted to a particular geographic or online location), and/or other information that can be used to identify appropriate distribution nodes that should distribute the media content.

If additional distribution nodes are identified, processing may return to operation 404, where an additional distribution node is identified. Otherwise, processing may proceed to an operation 412, where information related to the number of distributions by the distribution nodes is obtained.

In an operation 414, an aggregate number of times that the media content was distributed by the distribution nodes may be determined. In an operation 416, a determination of whether the aggregate number has reached the aggregate limit may be made. If the aggregate number has been reached, distribution of the media content may be discontinued in an operation 418. Otherwise, additional allocations of the media content may be provided in an operation 420 and processing may return operation 412.

Figure 5:
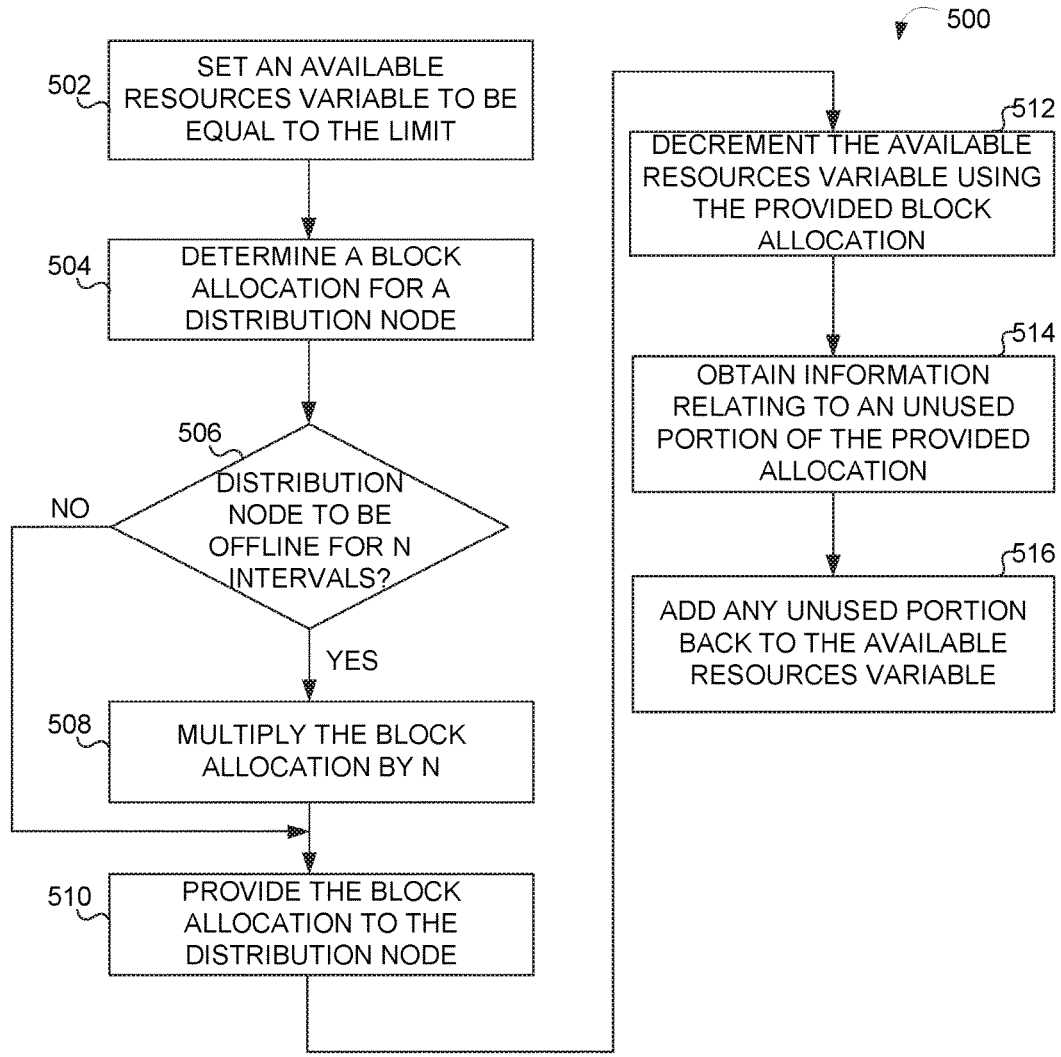
FIG. 5 illustrates a process of providing media content using a block model, according to an implementation of the invention.

FIG. 5 illustrates a process 500 of providing media content using a block model, according to an implementation of the invention. In an operation 502, an available resources variable may be set to be equal to the aggregate limit. In an operation 504, a block allocation for a distribution node may be determined. In an operation 506, a determination of whether the distribution node will be offline for N intervals may be made. Responsive to a determination that the distribution node will be offline for N intervals, the block allocation may be multiplied by N in an operation 508.

In an operation 510, the block allocation may be provided to the distribution node so that it may distribute the media content to other distribution nodes and/or to users, but not distribute the media content a number of times that exceeds the block allocation.

In an operation 512, the available resources variable may be decremented based on the block allocation. In an operation 514, information relating to an unused portion of the allocated block may be obtained. For example, the distribution node may report back after N intervals that the media content was not distributed up to its block allocation. In an operation 516, any unused portion may be added back to the available resources variable. As would be appreciated, instead of or in addition to the available resources variable (also referred to herein as a remaining number), process 500 and other processes described in other drawing Figures may update a used resources variable that tracks the number of allocations or distributions of the media content that have been used.

Figure 6:
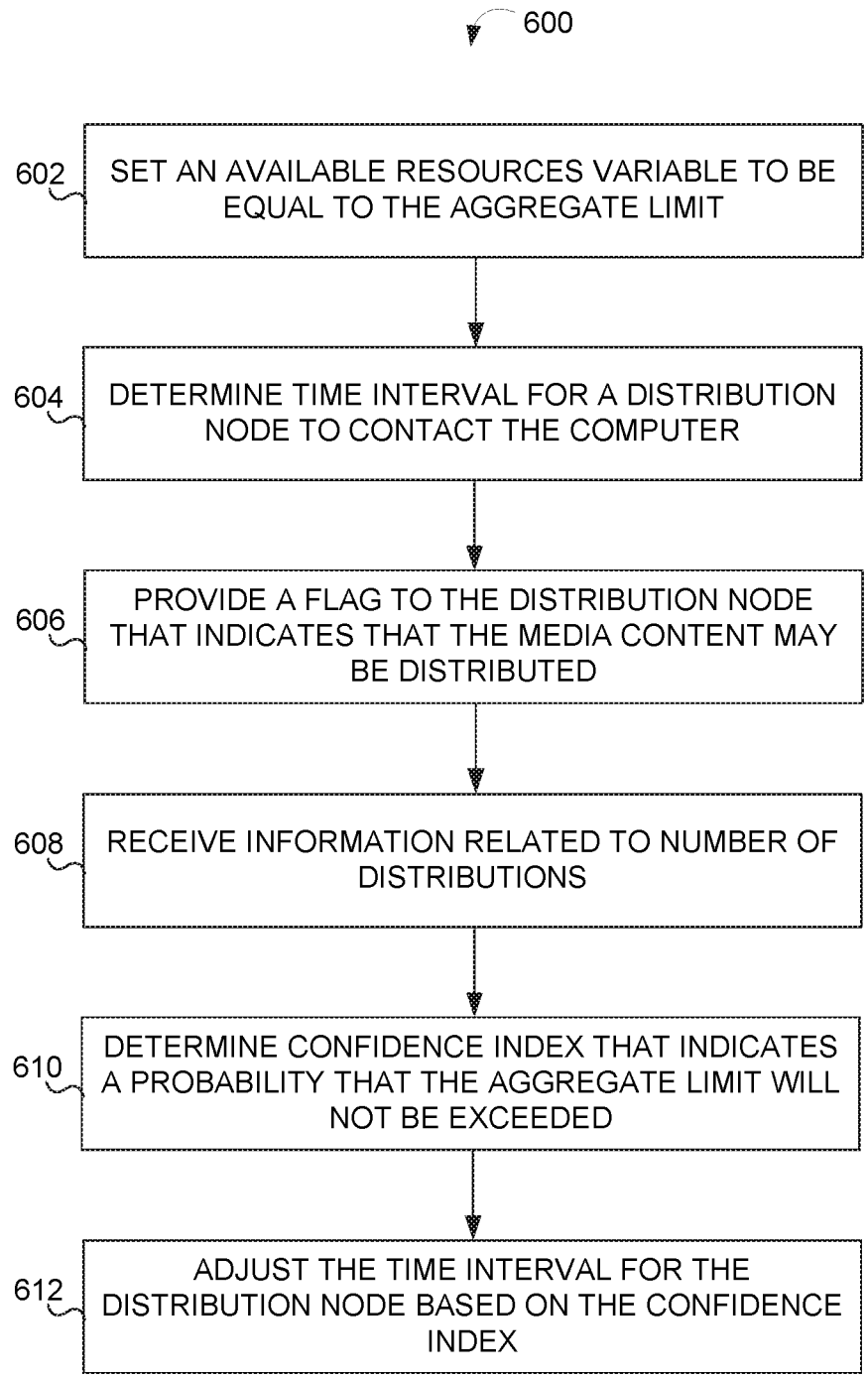
FIG. 6 illustrates a process of providing media content using a flag model, according to an implementation of the invention.

FIG. 6 illustrates a process 600 of providing media content using a flag model, according to an implementation of the invention. In an operation 602, an available resources variable may be set to be equal to an aggregate limit on the number of times that media content may be distributed. In an operation 604, a time interval for a distribution node to contact a computer may be determined and provided to the distribution node. The time interval may represent a duration of time in which media content may be distributed without limit by the distribution node.

In an operation 606, a flag that indicates that the media content may be distributed without limit for a duration of the time interval (which may or may not specify a start and an end time) is provided to the distribution node. In an operation 608, information related to the number of media content distributions made by the distribution node during the time interval may be received.

In an operation 610, the available resources variable may be decremented based on the number of media content distributions and a confidence index may be determined. The confidence index may indicate a probability that the aggregate limit will not be exceeded. In other words, the confidence index may indicate a probability that the media content may continue to be distributed without exceeding the aggregate limit. For example, a smaller confidence index may indicate a greater risk that the aggregate limit will soon be met/exceeded than a larger confidence index.

In an operation 612, the time interval for the distribution node may be adjusted based on the confidence index and provided to the distribution node. For example, as the confidence index gets smaller, the time interval may be adjusted downward to require that the distribution node check with the computer more often before distributing the media content. In this manner, as the number of distributions approaches the aggregate limit, the computer may maintain tighter control over the distribution of the media content. In some implementations, if the confidence index meets or passes a threshold confidence index, the flag may be switched to indicate that the distribution node should not distribute the media content.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of distributing media content, within an aggregate limit, through a plurality of distribution nodes, the method being implemented by a computer having one or more physical processors programmed with computer program instructions that, when executed by the one or more physical processors, program the computer system to perform the method, the method comprising:
   determining, by the computer:
      a confidence index that indicates a probability that the media content can be distributed without exhausting the aggregate limit,
      a length of a time interval during which a first distribution node, from the plurality of distribution nodes, is permitted to distribute the media content an unlimited number of times during the time interval,
      a block allocation for the first distribution node based on the aggregate limit,
      a number of the plurality of distribution nodes to which the media content is provided, and
      a total time during which the media content is to be distributed by the plurality of distribution nodes;
   providing, by the computer, to the first distribution node, the media content, and an indication of the length of the time interval;

determining, by the first distribution node:
  a second confidence index that is indicative of a probability that the block allocation will not be exhausted, and
  a second time interval during which a second distribution node, from the plurality of distribution nodes, is allowed unlimited distribution of the media content without contacting the first distribution node; and
providing, by the first distribution node, an indication of the second time interval to the second distribution node.

2. The method of claim 1, the method further comprising:
determining, by the computer, whether the confidence index meets or passes a predetermined threshold confidence index; and
responsive to a determination that the confidence index meets or passes the predetermined threshold confidence index, providing, by the computer, an indication to the first distribution node to discontinue provision of the media content.

3. The method of claim 1, the method further comprising:
receiving, by the computer, an indication of a number of times that the first distribution node distributed the media content;
determining, by the computer, an unused number based on the block allocation and the number of times that the first distribution node distributed the media content; and
adding, by the computer, the unused number back to a remaining number of times that the media content may be distributed.

4. The method of claim 1, the method further comprising:
receiving, by the first distribution node from the second distribution node, an indication of a number of times that the second distribution node distributed the media content during the second time interval; and
updating, by the first distribution node, the second confidence index based on the number of times that the second distribution node distributed the media content during the second time interval, wherein the second time interval is decreased as the second confidence index decreases.

5. The method of claim 4, the method further comprising:
determining, by the first distribution node, whether the confidence index satisfies a predetermined threshold confidence index; and
responsive to a determination that the confidence index meets or passes the predetermined threshold confidence index, providing, by the first distribution node, an indication to a third distribution node, from the plurality of distribution nodes, to discontinue provision of the media content.

6. The method of claim 1, the method further comprising:
providing, by the first distribution node, the media content to a second distribution node from the plurality of distribution nodes; and
providing, by the first distribution node, an indication to the second distribution node that the second distribution node may distribute the media content a particular number of times.

7. A system of distributing media content, within an aggregate limit, through a plurality of distribution nodes, the system comprising:
a computer comprising one or more physical processors programmed by computer program instructions that, when executed by the one or more physical processors, program the computer to:
  determine a confidence index that indicates a probability that the media content can be distributed without exhausting the aggregate limit;
  determine a length of a time interval during which a first distribution node, from the plurality of distribution nodes, is permitted to distribute the media content an unlimited number of times during the time interval;
  provide, to the first distribution node, the media content, and an indication of the length of the time interval
  determine a block allocation for the first distribution node based on the aggregate limit, a number of the plurality of distribution nodes to which the media content is provided, the time interval, and a total time during which the media content is to be distributed by the plurality of distribution nodes; and
the first distribution node, programmed to:
  determine a second confidence index that is indicative of a probability that the block allocation will not be exhausted;
  determine a second time interval during which a second distribution node, from the plurality of distribution nodes, is allowed unlimited distribution of the media content without contacting the first distribution node; and
  provide an indication of the second time interval to the second distribution node.

8. The system of claim 7, wherein the computer is further programmed to: determine whether the confidence index meets or passes a predetermined threshold confidence index; and
responsive to a determination that the confidence index meets or passes the predetermined threshold confidence index, provide an indication to the first distribution node to discontinue provision of the media content.

9. The system of claim 7, wherein the computer is further programmed to:
receive an indication of a number of times that the first distribution node distributed the media content;
determine an unused number based on the block allocation and the number of times that the first distribution node distributed the media content; and
add the unused number back to a remaining number of times that the media content may be distributed.

10. The system of claim 7, wherein the first distribution node is further programmed to: receive, from the second distribution node, an indication of a number of times that the second distribution node distributed the media content during the second time interval; and update the second confidence index based on the number of times that the second distribution node distributed the media content during the second time interval, wherein the second time interval is decreased as the second confidence index decreases.

11. The system of claim 10, wherein the first distribution node is further programmed to:
determine whether the confidence index meets or passes a predetermined threshold confidence index; and
responsive to a determination that the confidence index meets or passes the predetermined threshold confidence index, provide an indication to a third distribution node, from the plurality of distribution nodes, to discontinue provision of the media content.

12. The system of claim 7, further comprising the first distribution node, wherein the first distribution node is programmed to:

provide the media content to a second distribution node from the plurality of distribution nodes; and provide an indication to the second distribution node that the second distribution node may distribute the media content a particular number of times.

* * * * *